US012038896B2

(12) United States Patent
Konow Krause et al.

(10) Patent No.: US 12,038,896 B2
(45) Date of Patent: Jul. 16, 2024

(54) DATA INDEXING AND SEARCHING USING PERMUTATION INDEXES

(71) Applicant: eBay Inc., San Jose, CA (US)

(72) Inventors: Roberto Daniel Konow Krause, Los Gatos, CA (US); Mohnish Kodnani, Campbell, CA (US); Alberto Ordonez Pereira, Santa Clara, CA (US); Ravindra Surya Lanka, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/899,944

(22) Filed: Aug. 31, 2022

(65) Prior Publication Data
US 2022/0414079 A1    Dec. 29, 2022

Related U.S. Application Data

(63) Continuation of application No. 16/016,788, filed on Jun. 25, 2018, now Pat. No. 11,449,484.

(51) Int. Cl.
*G06F 16/22* (2019.01)
*G06F 16/2457* (2019.01)
(Continued)

(52) U.S. Cl.
CPC .... *G06F 16/2237* (2019.01); *G06F 16/24578* (2019.01); *G06F 16/9535* (2019.01)

(58) Field of Classification Search
CPC .......... G06F 16/2237; G06F 16/24578; G06F 16/9535; G06F 16/9536; G06F 16/9538; G06F 16/953
See application file for complete search history.

(56) References Cited

U.S. PATENT DOCUMENTS 6,349,308 B1    2/2002  Whang et al.
9,436,702 B2 *  9/2016  Pryakhin ............. G06F 16/2246
(Continued)

FOREIGN PATENT DOCUMENTS

CN    1477563 A1    2/2004
EP    2405391 A1    1/2012

OTHER PUBLICATIONS

Andoni, "Nearest Neighbor Search: the Old, the New, and the Impossible", Retrieved from the Internet URL <http://www.mit.edu/~andoni/thesis/main.pdf>, Sep. 4, 2009, 178 pages.
(Continued)

*Primary Examiner* — Hosain T Alam
*Assistant Examiner* — Cecile H Vo
(74) *Attorney, Agent, or Firm* — Shook, Hardy & Bacon L.L.P.

(57) ABSTRACT

Systems and methods are provided for creating and utilizing search indexes with different properties to provide efficient and flexible means for retrieving and ranking high-dimensional content. A first index and a second index are generated with a different sets of properties, which may include a permutation prefix length and a vector quantization scheme, and are each associated with a computational workload. Further, at least one index structure may be created with a posting list associated with a permutation prefix and a set of references, rather than only a permutation prefix, to balance out posting lists of variable lengths within the index. Another embodiment of the disclosure provides for expansion of search results at search time, rather than during indexing, by retrieving posting lists associated with shorter permutation prefix after an initial list is determined to have insufficient recall.

20 Claims, 10 Drawing Sheets

(51) Int. Cl.
*G06F 16/9535* (2019.01)
*G06F 16/95* (2019.01)

(56) References Cited

U.S. PATENT DOCUMENTS

| | | | |
|---|---|---|---|
| 9,767,183 | B2 | 9/2017 | Su et al. |
| 11,449,484 | B2 | 9/2022 | Kraus et al. |
| 2005/0055446 | A1 | 3/2005 | Chidambaran et al. |
| 2008/0183685 | A1* | 7/2008 | He .................... G06F 16/24575 |
| 2008/0263033 | A1 | 10/2008 | Vailaya et al. |
| 2015/0169740 | A1* | 6/2015 | Gunderson ............. G06F 16/27 |
| | | | 707/E17.082 |
| 2016/0283474 | A1 | 9/2016 | Patterson |
| 2019/0272344 | A1* | 9/2019 | Lu ........................ G06V 10/761 |
| 2019/0347256 | A1 | 11/2019 | Wu et al. |
| 2019/0392058 | A1 | 12/2019 | Konow Krause et al. |

OTHER PUBLICATIONS

Babenko et al., "The Inverted Multi-Index", Apr. 16, 2018, 8 pages.
Chavez et al., "Near Neighbor Searching with K Nearest References", Retrieved from the Internet URL: <https://users.dcc.uchile.cl/~gnavarro/ps/is15.pdf>, Dec. 3, 2014, 38 pages.
Chavez et al., "Near Neighbor Searching with K Nearest References", Center of Biotechnology and Bioengineering, Department of Computer Science, University of Chile, Chile, Dec. 3, 2014, 38 pages.
Douze,"Polysemous codes", Retrieved from the Internet URL: <https://arxiv.org/abs/1609.01882>, Oct. 10, 2016, 18 pages.
Douze et al., "Polysemous Codes", Facebook AI Research, Oct. 10, 2016, 18 pages.
Hyvonen et al., "Fast k-NN Search", Retrieved from the Internet URL : <https://arxiv.org/pdf/1509.06957.pdf>, Aug. 19, 2016, 10 pages.
Jegou et al., "Product Quantization for Nearest Neighbor Search", Retrieved from the Internet URL : <https://lear.inrialpes.fr/pubs/2011/JDS11/jegou_searching_with_quantization.pdf>, 2009, 14 pages.
Jegou et al., "Product quantization for nearest neighbor search", Aug. 2009, 14 pages.
Naidan, "Engineering Efficient Similarity Search Methods", Retrieved from the Internet URL: <https://ntnuopen.ntnu.no/ntnu-xmlui/handle/11250/2441681>, May 2017, 146 pages.
Tesic et al., "Nearest Neighbor Search for Relevance Feedback", 2003 IEEE Computer Society Conference on Computer Vision and Pattern Recognition, 2003, 6 pages.

\* cited by examiner

DATA INDEXING AND SEARCHING USING PERMUTATION INDEXES

CROSS-REFERENCE TO RELATED APPLICATIONS

This patent application is a continuation of U.S. patent application Ser. No. 16/016,788, entitled, "Data Indexing and Searching Using Permutation Indexes," filed Jun. 25, 2018, which is herein incorporated by reference in its entirety for all purposes.

BACKGROUND

Information searching over a network, such as the Internet, is a common method for finding relevant information. Generally, a searching algorithm is used to find digital content relevant to search query within one or more selected databases. However, the volume of digital content is vast and growing. Searching for relevant content within voluminous content collections is challenging, and there is often a trade-off between accuracy and the computational workload expended to retrieve the results. For instance, searching and ranking more content is more likely to yield accurate and useful results, but searching through a larger amount of content also requires more processing power and can take longer. This problem is particularly true for high-dimensional digital content, such as images. To reduce the computational load for a search, only a particular set of objects or a particular database is often searched. For instance, a category in an online publishing website may need to be selected to filter objects, and only objects within that category are searched and ranked for relevance. Category searching, however, necessarily limits a user's ability to receive search results across multiple categories.

SUMMARY

Embodiments of the present invention are directed towards systems and methods for creating and utilizing search indexes with different properties to provide efficient and flexible techniques for searching high-dimensional digital content. Accordingly, in one embodiment, a first index and a second index are generated with posting lists for a plurality of object vectors. The two indexes are created with a unique set of properties, which may include a permutation prefix length and a vector quantization scheme, and the indexes are each associated with a computational workload. When a search query is received, an index may be selected for searching based on the computational workload capacity of the system at the time of the search. Additionally or alternatively, an index may be selected for searching based on a recall amount. Further, one or more index structures may be created with a posting list associated with a permutation prefix and a set of references, rather than just a permutation prefix, to balance out posting lists of variable lengths within the index. For instance, after determining a posting list associated with a first permutation prefix does not meet a minimum recall, a new posting list is created for a second permutation prefix and a set of references in accordance with some embodiments herein. The second permutation prefix is a portion of the first permutation prefix, and the set comprises two or more references that may form part of a permutation. The second posting list includes object vectors with permutations having the second permutation prefix and one additional reference from the set. All object vectors within the second posting list share the second permutation prefix but may have different additional references. The second posting list is stored within an index structure and is traversed when a search query has a permutation matching the second permutation prefix and an additional reference within the set.

Another embodiment of the disclosure provides for expansion of search results at search time, rather than during indexing. Accordingly, after a received search query is translated into a query vector, a first prefix for a permutation for the query vector is identified using a first prefix length, and a first posting list corresponding to the first prefix is retrieved. Upon determining the first posting list does not satisfy a threshold number of objects, a second permutation prefix is identified based on a second prefix length that is shorter than the first prefix length. A second posting list corresponding to the second prefix has more objects than the first posting list. Accordingly, a results list is generated with a ranking of objects within the second posting list based on relevancy scores computed for the objects.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
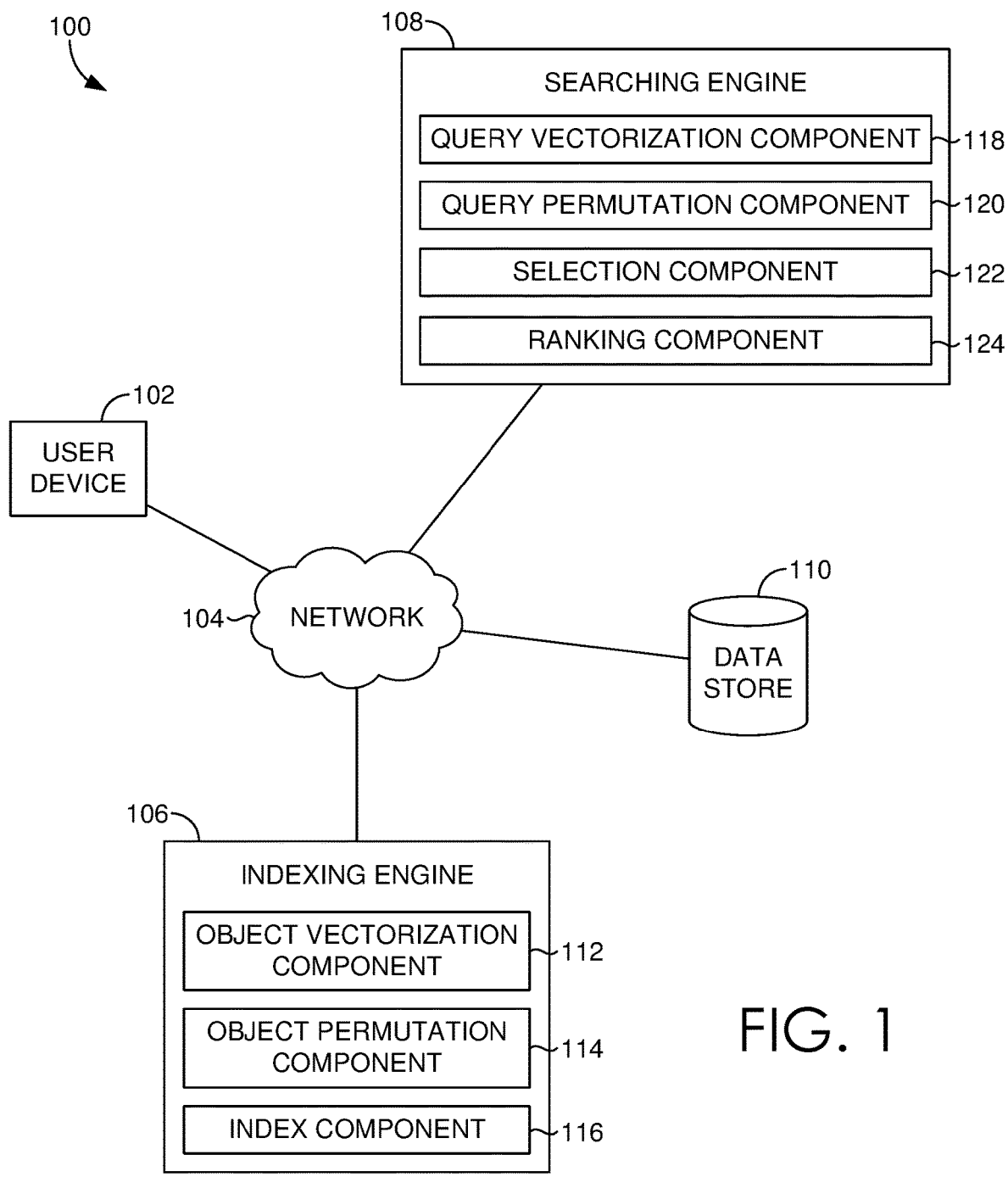
FIG. 1 depicts an example configuration of an environment in which one or more implementations of the present disclosure can be employed, in accordance with various embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present disclosure are directed towards indexing, searching, and ranking digital content by leveraging different search index properties to provide different mechanisms for balancing accuracy and computational workload requirement. Within the field of information retrieval, a searching algorithm is typically used to find digital content relevant to a search query. Proximity searching is generally considered identifying and, in some instances, ranking, objects in a database that are closest to a search query. However, the volume of digital content is vast and growing. Searching for relevant content within voluminous content collections is challenging, and there is often a trade-off between accuracy and the computational workload expended to retrieve the results. For instance, searching and ranking more content objects is more likely to yield accurate and useful results, but searching through a larger number of objects also requires more processing power and can take longer. This problem is particularly true for high-dimensional digital content, such as images. For instance, the dataset to be searched can potentially be in the order of billions of vectors for the content objects, even when limited to content on a particular website, such as a third-party content publishing site.

To reduce the computational load for a search, only a particular set of objects or a particular database is often searched. For instance, a category in an online publishing website may be selected to filter objects, and only objects within that category are searched and ranked for relevance. Category searching, however, necessarily limits a user's ability to receive search results across multiple categories.

Accordingly, embodiments of the present invention are directed towards a system that creates search indexes with properties, such as permutation prefix length and product quantization, to provide a more efficient search process. As used herein, permutation refers to an order of references in increasing distance from a given object vector in a vector space. In this way, permutation provides a relative location of an object vector within a vector space, and vectors with similar permutations will be near each other within the vector space. Accordingly, permutations may be used as a measure of similarity between objects within a data base (i.e., search result candidates) and a search query. A permutation prefix is a portion of the permutation. Shorter permutation prefixes tend to be more inclusive in that more vectors, such as object vectors or a search query vector, will share shorter permutation prefixes compared to longer permutation prefixes. In this way, permutation prefix length may affect the amount of objects to be searched and ranked for a given search query. Vectorization refers to the translation of content, such as content to be searched or the search query, into a vector. Vector quantization, such as product quantization, is used to further change a vector to a vector with fewer dimensions. As described in more detail below, reducing the number of dimensions in a vector can save memory because such vectors require less storage space and reduces the computational power required to rank the vectors relative to a search query. In this way, the accuracy of the search results and workload required may be determined from a permutation prefix length and vector quantization scheme used.

Accordingly, embodiments of the disclosed system are directed towards creating indexes with different properties to provide flexibility in the searching process based on the needs and limitations of the system at the time of a search. For example, in some embodiments, a first index is generated with a first set of properties associated with a first computational workload, and a second index is generated with a different set of properties associated with a second computational workload. As used herein, computational workload refers to a processing power and/or time for completion of a search or a portion thereof. The properties of the indexes may include a permutation prefix length, which effects the length of the posting lists within the index that will be traversed at the time of a search. As used herein, a posting list refers to a grouping of objects within an index that share a common characteristic, such as a permutation prefix length, and may be retrieved together as possibly relevant search results. The properties may also include a vector quantization scheme, which effects the amount of data space needed to store the index and the computational power needed to traverse the posting lists at the time of the search. Accordingly, in some aspects, an index for searching is selected in response to a search query based on the computational power capacity at the time of the search. In this way, an index associated with a lower computational workload may be selected when a system has limited capacity at the time of a search.

Additionally, some embodiments are directed towards creating a more efficient index structure by using a posting list with a permutation prefix and set of references to balance out posting lists of variable lengths within the index. For instance, in one embodiment, a first posting list is created for a first permutation prefix. The first posting list includes objects vectors with permutations having the first permutation prefix. When it is determined that the number of objects within the first posting list does not satisfy a threshold number, a second posting list is created for a second permutation prefix and a set of references. The second permutation prefix is a portion of the first permutation prefix, and the set comprises two or more references that may form part of a permutation. The second posting list includes object vectors with permutations having the second permutation prefix and one additional reference within the set. All object vectors within the second posting list share the second permutation prefix but may have different additional references from the set. In this way, the second posting list expands on the first posting list. The second posting list is stored within an index structure and is traversed when a search query has a permutation matching the second permutation prefix and an additional reference within the set.

A further embodiment provides for expansion of search results at search time, rather than during indexing. After a received search query is translated into a query vector, a first prefix for a permutation for the query vector is identified using a first prefix length. A first posting list corresponding to the first prefix is retrieved from a first index. Upon determining the first posting list does not satisfy a threshold number of objects, a second permutation prefix is identified based on a second prefix length that is shorter than the first prefix length. A second posting list corresponding to the second prefix is retrieved from a second index. In exemplary aspects, the second posting list has more objects than the first posting list because the second prefix is shorter than the first prefix, which expands the available objects that may share the permutation prefix. A results list is then generated with a ranking of objects within the second posting list. The ranking is based on relevancy scores computed for the objects.

Example Computing Environment

FIG. 1 depicts an example configuration of an environment in which some implementations of the present disclosure can be employed for generating and searching indexes to provide search results in response to search queries. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 12.

It should be understood that environment 100 shown in FIG. 1 is an example of one suitable operating environment. Among other components not shown, environment 100 includes one or more user devices, such as user device 102, network 104, indexing engine 106, searching engine 108, and one or more data stores 110. Each of the components shown in FIG. 1 may be implemented via any type of computing device, such as one or more of computing device 1200 described in connection to FIG. 12, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

User device 102 may be any type of computing device capable of being operated by a user. For example, in some implementations, user device 102 is the type of computing device described in relation to FIG. 12. By way of example and not limitation, user device 102 may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices.

User device 102 may include one or more processors and one or more computer-storage media. The computer-storage media may include computer-readable instructions executable by the one or more processors. The instructions may be embodied by one or more applications.

User device 102 may include one or more applications capable of facilitating the exchange of information between user device 102 and one or more of indexing engine 106 and searching engine 108. In some implementations, this application is a web application that can run in a web browser and could be hosted at least partially on the server-side of environment 100. In some cases, the application is integrated into the operating system (e.g., as a service). It is, therefore, contemplated herein that "application" be interpreted broadly.

In accordance with embodiments herein, indexing engine 106 indexes and stores digital content to be subsequently searched and ranked in response to a search query. Digital content stored to be retrieved in response to a search query is referred to in as "objects" or "content objects." Indexing engine 106 creates index structures with different sets of properties, such as permutation prefix length and vector quantization scheme, such that different indexes may be associated with different computational workloads. The particular index to be searched may be selected based on the computational workload available. Further, different properties may be used to achieve a balanced computational workload within different indexes as described further below. Indexing engine 106 may also create index structures with a posting list associated with a permutation prefix length plus a set of references to provide more flexibility in available content to be searched. In creating and saving indexes for later use, indexing engine 106 may utilize recall, which refers to the number of content objects in posting lists within each index, and the computational workload that will be required to traverse the posting lists when selecting and ranking objects in response to a search query.

The searching engine 108 uses the one or more indexes created by the indexing engine 106 to retrieve objects in response to a search query and, in some instances, rank the identified objects using a relevancy score. In exemplary embodiments, the searching engine 108 selects an index and then identifies objects with similarities to the search query from a posting list within the selected index. The searching engine 108 may then traverse the posting list and rank objects using a proximity search algorithm. As will be described in greater detail below, selection of the index to search may involve balancing recall, the computational workload required to traverse the posting list, and the precision of the objects vectors within the posting list. Generally, it is desirable to have sufficient recall to provide useful search results to a user, but too many objects will require more processing power and time during ranking. Accordingly, in some aspects, if searching engine 108 initially selects a first posting list from a first index with insufficient recall, searching engine 108 can expand the results by traversing a second posting list from a second index. Additionally, depending on the properties of the selected index, the relevancy scores for ranking the objects may be based on more or less precise approximations of objects within the posting list in the index.

The indexing engine 106 and the searching engine 108 may operate via one or more servers that include one or more processors and one or more computer-storage media. The computer-storage media includes computer-readable instructions executable by the one or more processors. The instructions may optionally implement one or more components of the indexing engine 106 and the searching engine 108, described in additional detail below. In some aspects, the indexing engine 106 and searching engine 108 are implemented on separate servers or separate sets of servers. Alternatively, the functions of the indexing engine 106 and searching engine 108 may be carried out by the same server or set of servers. Further, it should be appreciated that indexing engine 106 and/or searching engine 108 may be provided via multiple devices arranged in a distributed environment that collectively provide the functionality described herein. For cloud-based implementations, an application on user device 102, such as a web browser, may be utilized by a user to interface with the functionality implemented by indexing engine 106 and/or searching engine 108. Additionally, other components not shown may also be included within the distributed environment.

The indexing engine 106 and the searching engine 108 are in communication with one or more data stores, such as data store 110. In implementations of the present disclosure, data store 110 is configured to be searchable and may be used to store the object vectors for content objects to be searched. For instance, data store 110 may include the indexes created by the indexing engine 106. Further, data store may be used to store the query vectors for received search queries and logs of the search queries and results. Data store 110 may further store computer instructions (e.g., software program instructions, routines, or services), data, and/or models used in embodiments described herein. In some implementations, data store 110 stores information or data received via the various components of indexing engine 106 and/or searching engine 108 and provides the various components with access to that information or data as needed. Although depicted as a single component, data store 110 may be embodied as one or more data stores. Further, the information in data store 110 may be distributed in any suitable manner across one or more data stores for storage (which may be hosted externally or internally).

Returning to indexing engine 106, embodiments of indexing engine 106 create and store indexes comprising posting lists of objects for later selection based on a search query. In exemplary aspects, indexing engine 106 comprises an object vectorization component 112, a permutation component p114, and an index component 116.

Object vectorization component 112 translates each content object into a vector for storing and determining proximity to search query vectors. Vectors are representations of an object in a vector space, such as hyperspace (also referred to herein as n-dimensional space). In exemplary aspects, the content objects are high dimensional content, such as images, and each dimension may be individually represented in a vector. Because such high-dimensional vectors require a lot of storage space, object vectorization component 112 further transforms high-dimensional vectors into vectors with fewer dimensions using a vector quantization scheme. In exemplary embodiments, this process is done using product quantization.

As used herein, product quantization is a mechanism to quantize vector values to reduce the size of the vector. Vectors of d-dimensions are each divided into blocks of size b, and for each block of size b, k clusters are created using k-means or other clustering technique. Each block may be represented by the closest centroid of the block, rather than using floating point values for each block. In some aspects, the Euclidean distances of all centroids are computed and stored in a table. In exemplary aspects, an object vector for high dimensional content comprises 1024 dimensions and is divided into blocks of size 8, resulting in 128 blocks. Using a clustering technique, such as k-means, 256 clusters are created per block, and the closest centroid is identified for each block. The resulting product quantized vector results comprises 128 centroids identifiers representing the blocks of dimensions.

Figure 2:
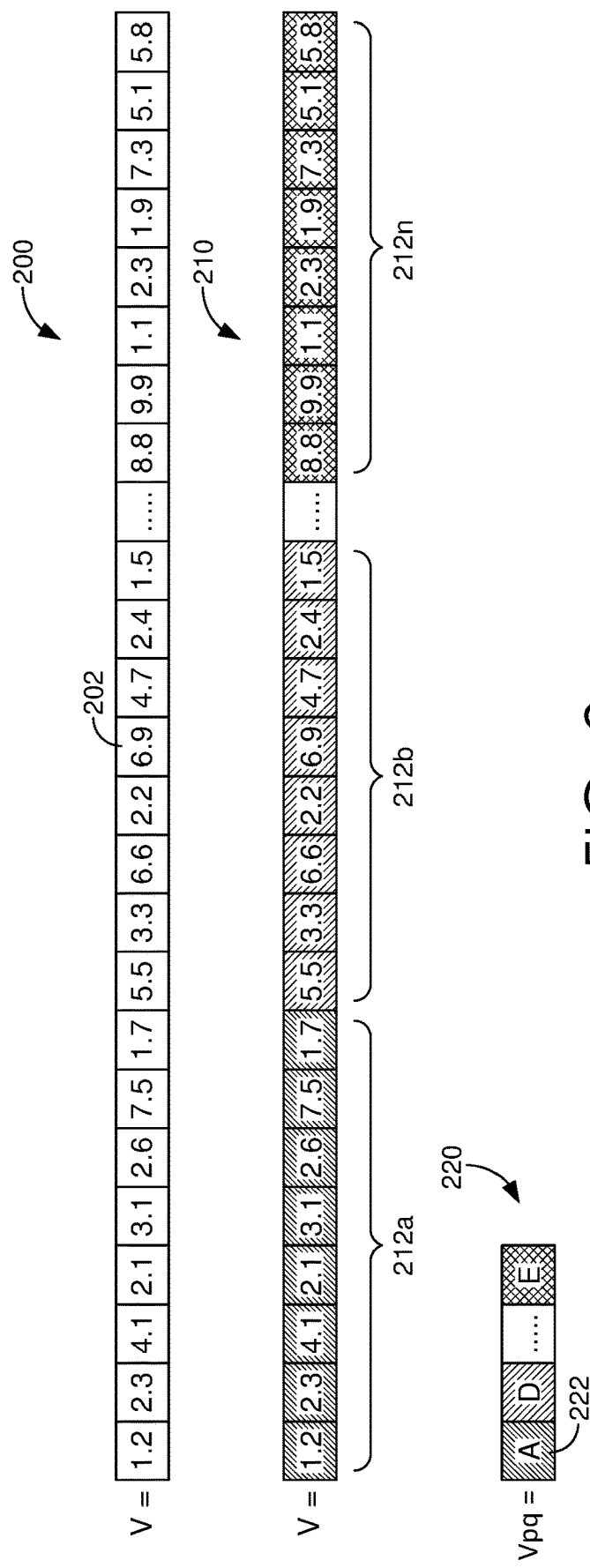
FIG. 2 depicts a schematic representation of product quantization of a vector, in accordance with various embodiments of the present disclosure.

FIG. 2 provides a schematic representation of product quantization. An original vector 200 is made up of a plurality of dimensions 202 representing one object of digital content. As shown in vector 210, the dimensions are grouped together in blocks. Vector 210 includes blocks 212a and 212b through 212n, with each block comprising 8 dimensions. A product quantized vector 220 comprises a series of centroid identifiers 222 to represent the closest centroid for each block 212a through 212n.

Storing the product quantized vector 220 requires less memory than the original vector 200. For instance, each dimension (which may be referred to as a float) may be approximately 4 bytes; whereas, in exemplary aspects, each centroid identifier is the size of approximately 1 byte. This difference in required memory space is significant when considering the difference scaled for an entire object vector, such as 1024-dimension vector, and for millions (or sometimes billions) of object vectors being stored. While codebooks used to identify the values of the centroids for each vector block are also required when using product quantized vectors, the storage spaced required for a code book is significantly less than storing the non-quantized vector regardless of the vector quantization scheme used.

Figures 3, 4A, 4B:
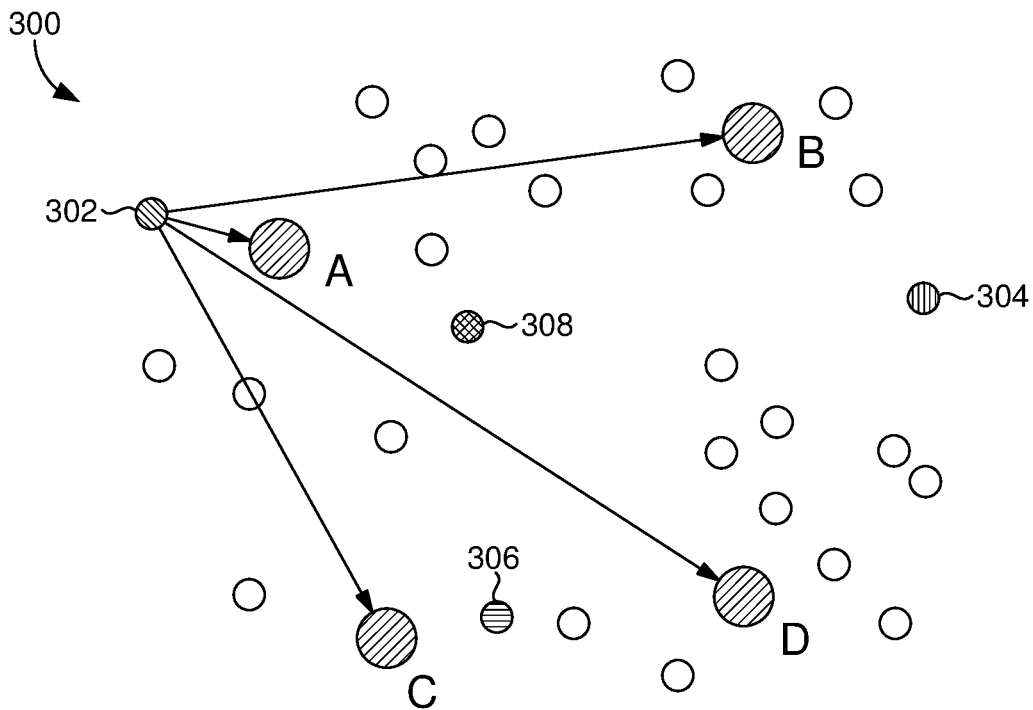
FIG. 3 depicts a permutation of an object vector in vector space, in accordance with embodiments of the present disclosure.
FIGS. 4A and 4B depict example inverted indexes associated with different permutation prefix lengths, in accordance with embodiments of the present disclosure.

Returning to FIG. 1, object permutation component 114 determines a permutation for each object vector within a dataset. As previously stated, a permutation refers to an order of references in increasing distance from a given object vector in vector space and, as such, indicates a relative location of an object vector within vector space. To determine a permutation, a plurality of reference points are selected within a vector space, and each reference point, which is also referred to herein as a pivot, is assigned a label. The reference points may be selected at random or using k-means or k-means++ algorithms. The distance between each object vector and each pivot is computed. FIG. 3 depicts a schematic representation of a vector space 300 in which four pivots are labeled A, B, C, and D. Object vectors representing each object within a dataset are represented by the smaller dots in FIG. 3. To determine the permutation for object 302, object permutation component 114 computes the respective distances between object 302 and pivots A, B, C, and D. The distance is computed as an Euclidean distance in exemplary embodiments; however, it is contemplated that other distance functions may be used, such as Manhattan distance, Hamming distance, Levenshtein distance, and the like. The permutation for object 302 is the order of the pivots starting with the closest pivot to the further pivot. This process is repeated for each object in vector space, including objects 304, 306, and 308. Accordingly, in the example shown in FIG. 3, the permutation for object 302 is ACBD; the permutation for object 304 is BDAC; the permutation for object 306 is CDAB; and the permutation for object 308 is ACDB. To simplify this example, permutations for only these four objects are determined; however, in practice, permutations for each object represented in the vector space is determined.

Returning to FIG. 1, index component 116 generates indexes of objects within a data set. Multiple indexes are created by index component 116, with each index having a different set of properties that can result in different computational workloads when the indexes are used to identify and rank objects in response to a search query. The set of properties of the indexes may include permutation prefix length and/or product quantization scheme. In exemplary embodiments, the indexes created by index component 116 are inverted indexes.

A permutation prefix is the first portion of a permutation and is of a particular length. For instance, "AC" is the first two references in the permutation for object 302 in FIG. 3 and, therefore, is the two-reference permutation prefix of object 302. One or more of the indexes generated by index component 116 may be associated with a particular permutation prefix length. Continuing with the example from FIG. 3, FIGS. 4A and 4B depict indexes 400 and 410, respectively, that are associated with different permutation prefix lengths. Indexes 400 and 410 are both inverted indexes mapping permutation prefixes to objects. In exemplary aspects, the list of objects mapped to unique prefix is referred to herein as a posting list because it represents the objects that may be provided in response to a query matching that permutation prefix as described in more detail with respect to FIG. 11. Index 400 is associated with a prefix length of two, and index 410 is associated with a prefix length of three. As illustrated, each of the objects 302, 304, 306, and 308 have a unique three-pivot permutation prefix, such that each posting list in the index 410 comprises one object vector. Because objects 302 and 308 have the same two-pivot permutation prefix, one posting list in index 400 has two object vectors.

As demonstrated in FIGS. 4A-4B, indexes associated with shorter prefix lengths will generally have longer posting lists as it is more likely for objects to share a smaller number of pivots. Accordingly, there may be a tradeoff with different prefix lengths. Longer posting lists resulting from shorter prefix lengths provide more results in response to a given search query but also require more memory capacity. Ranking objects within a longer posting list is also more computationally expensive compared to ranking objects within a shorter posting list.

Figure 5:
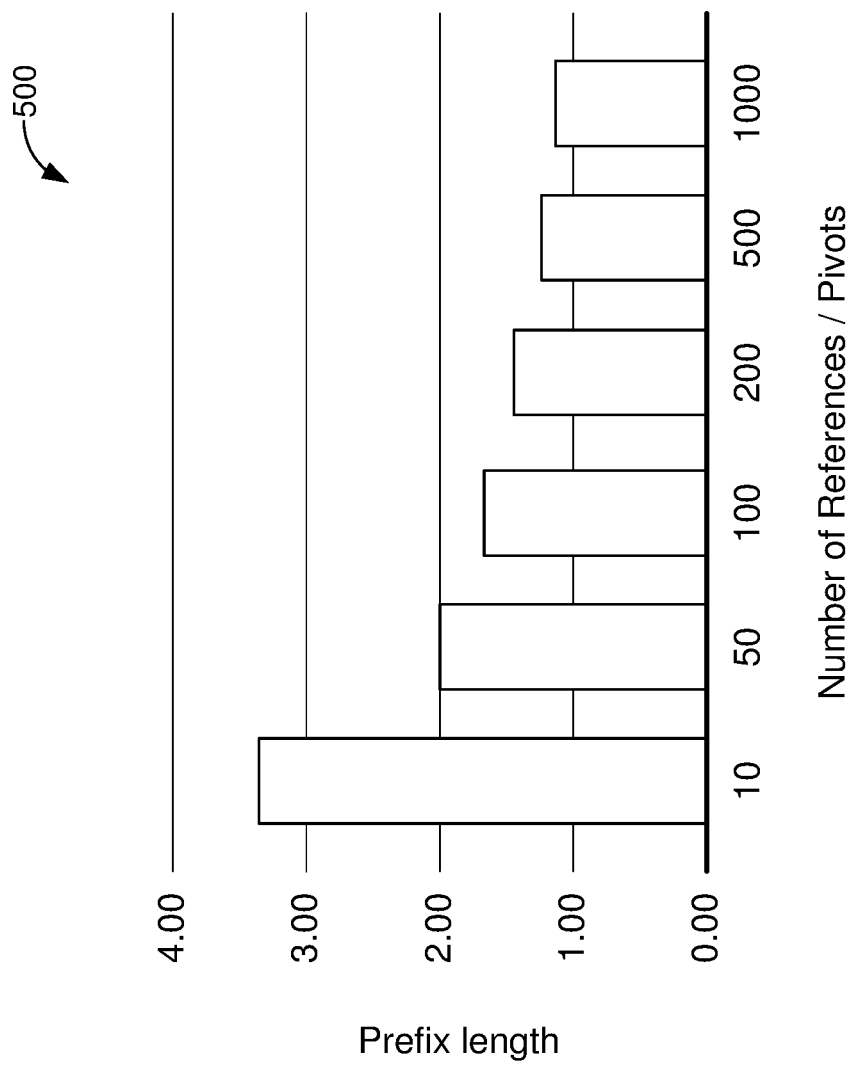
FIG. 5 depicts a graph mapping the number of references to a prefix length to obtain a fixed posting list length, in accordance with embodiments of the present disclosure.
Figure 6:
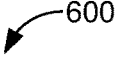
FIG. 6 depicts a table indicating posting list length for combinations of number of references and permutation prefix length, in accordance with embodiments of the present disclosure.

In addition to prefix length, the number of objects within a posting list depends on the number of references, or pivots, used to determine the permutations. FIG. 5 depicts a graph 500 that illustrates the relationship between the number of references, prefix length, and posting length. As shown in graph 500, to maintain a particular posting list size, the prefix length must be reduced as the number of references increases. FIG. 6 provides a table 600 that indicates the average length a posting list per shard for different combinations of number of references (e.g., pivots) and prefix length in an example embodiment of the present disclosure. As used herein, shards refer to divisions or partitions of an index that are stored separately due to the size of the total objects within the index. Table 600 further shows the total number of object candidates, which is the sum of the objects from all the shards. In exemplary embodiments, the combinations of number of references and prefix length used to create the indexes are the ones in which the total number of candidate objects is between 5,000 and 50,000, as shown in the highlighted rows in FIG. 6.

Indexes created by index component 116 store objects within posting lists as vectors created using vector quantization, and objects may be stored in different indexes as vectors created using different vector quantization schemes. In exemplary embodiments, the different schemes divide the vectors into blocks of different sizes. A first index may store product quantized vectors with blocks of greater dimensions than a second index. For instance, in one embodiment, a first index stores objects as vectors with blocks of 8 dimensions, where a second index stores objects as vectors with blocks of 4 dimensions. More dimensions per block results in less blocks per vector and, therefore, a vector that requires less memory capacity. Conversely, less dimensions per block results in a greater number of blocks, which requires more memory. While vectors with less blocks take up less space, they are greater approximations of the original vectors compared to product quantized vectors with more blocks. Accordingly, the resulting product quantized vector formed with less blocks is less precise and more likely to yield less accurate results when determining relevancy to a search query.

As both permutation prefix length and product quantization scheme result in tradeoffs, these properties may be used to create indexes with different workloads. For instance, a first index may be associated with a longer prefix length and a product quantization scheme with more dimensions per block (and, thus, less blocks per vector), while a second index may be associated with a shorter prefix length and a product quantization scheme with less dimensions per block. In this example, the first index is associated with a lower computational workload than the second index because both the prefix length and the product quantization scheme of the first index require less computational power to be used when selecting and ranking the objects within posting lists of the first index. Further, the first index will require less storage space.

In some aspects, the first set of properties for the first index and the second set of properties of the second index may have one or more properties in common. For instance, the first and second indexes may be associated with the same product quantization scheme and different permutation prefix lengths. The different permutation prefix lengths may still result in different computational workloads being associated with the first and second indexes, but the difference in workload may be less than in the earlier example in which indexes had different permutation prefix lengths and different product quantization schemes. Similarly, in another example, the first and second indexes may be associated with the same permutation prefix length but with different product quantization schemes.

In other embodiments, index component 116 utilizes the different properties to balance a computational workload for one or more indexes. For instance, a first index may be associated with a shorter prefix length and a product quantization scheme with more dimensions per block. While the shorter prefix length is typically associated with higher computational workloads, the workload may be at least partially balanced by the product quantization scheme with more dimensions per block, which is less computationally expensive. Conversely, a second index may be associated with a longer prefix length and a product quantization scheme with less dimensions per block. This second index may have substantially the same or similar computational workload as the first index but yield different results. For instance, with a longer prefix length, it is more likely there are fewer objects within any given posting list for a search query but the product quantized vectors with fewer dimensions per block are more precise approximations of the object vectors within index.

Figure 7:
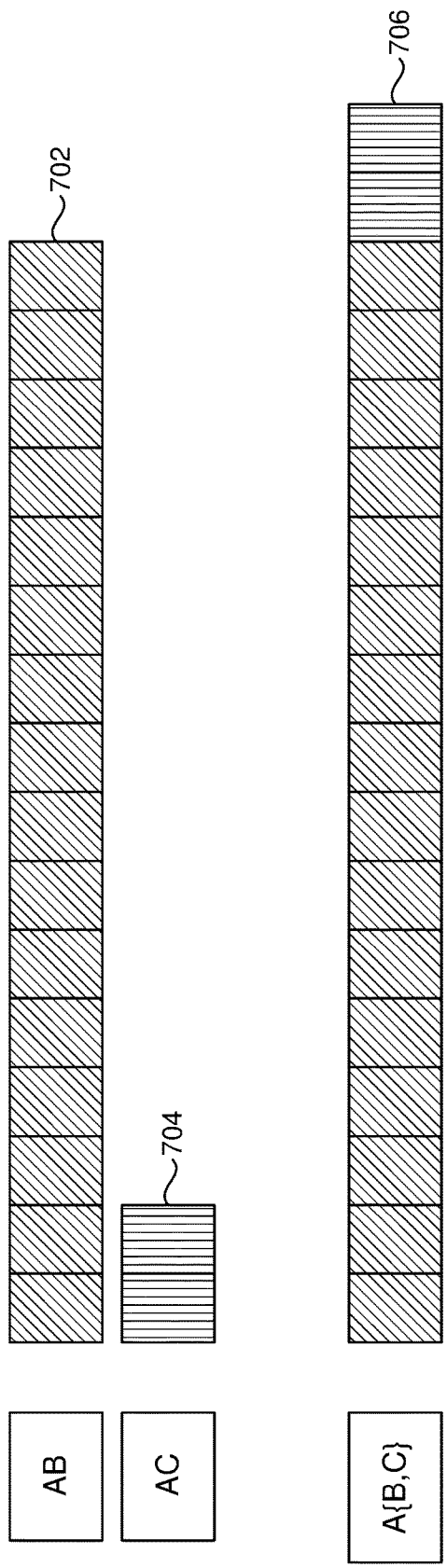
FIG. 7 depicts a schematic representation of a posting list for a permutation prefix and a set of references, in accordance with embodiments of the present disclosure.

Further, in some aspects, index component 116 creates indexes associated with a permutation prefix plus a set of references, rather than only a permutation. A permutation prefix plus a set may be used to collapse posting lists of permutation prefixes of the same length. Collapsing the posting lists may be desirable when there is a significant difference in posting list lengths. For example, FIG. 7 depicts a schematic representation of a posting list from an index associated with a permutation plus a set. A prefix length of two may have, among others, a permutation of AB and a permutation of AC. As illustrated in FIG. 7, the posting list 702 for AB is disproportionately large compared to posting list 704 for AC. Posting list 704 for AC may be small enough that it would not provide sufficient recall for a query with a permutation prefix matching AC and, thus, may require traversing a different posting list, such as a posting list on an index associated with a smaller prefix length. To avoid traversing a posting list in a different index, the permutations AB and AC may be converted into the permutation A plus the set [B,C], as shown in FIG. 7. The resulting posting list 706 includes all objects with the permutation prefix A followed by either B or C. In this way, AB is considered equivalent to AC.

Accordingly, the "set" is a set of references, one of which follows the permutation prefix. In exemplary aspects, to conserve the proximity invariants, the references within the set are references that have the next closest distance to the last reference within the permutation (e.g., "A"). For example, if B was the closest reference to A and C was the next closest reference to A, then posting lists for AB and AC may be collapsed into a one with a permutation prefix A plus set [B, C]. Where a fourth reference D is the third closest to reference A, posting lists for permutation prefixes AB and AD could not be collapsed, but posting lists for permutations prefixes AC and AD may be collapsed. Further, the references within the set may be the closest references to each other such that they are similar. For example, if C is the closest reference to B, posting lists for permutations with either B or C, such as AB and AC, may be collapsed into a single posting list.

As previously stated, the searching engine 108 uses the one or more indexes created by the indexing engine 106 to select objects in response to a search query and, in exemplary aspects, rank the identified objects using a relevancy score. In embodiments described herein, searching engine 108 comprises query vectorization component 118, query permutation component 120, selection component 122, and ranking component 124. As described above, objects within a dataset are stored as vectors, such as product quantized vectors, and indexed according to permutation prefixes. Consequently, to identify relevant objects using the index, query vectorization component 118 translates a received search query into a vector, and query permutation component 120 determines a permutation for the search query. The search query may be received from a remote user device interfacing with the search engine 108 via a web browser. For example, the search query may be input into a search field on a website for a third-party content publisher. In some aspects, the search query is high-dimensional content, such as an image. In exemplary embodiments, the search query is translated into a vector of a similar structure as objects stored in the index. As such, product quantization may be used to create the search query vector. The vectorization process for search queries is similar to the process described with respect to the object vectorization component 112 and illustrated in FIG. 2.

Similarly, query permutation component 120 determines a permutation for the search query vector in a similar manner described with respect to object permutation component 114 of FIG. 1 and illustrated in FIG. 3. The references used for identifying the permutation of the search query vector are the same references used for determining permutations of the objects. Using the same references allows the permutations of the object vectors and the search query vector to be used to determine proximity between the objects and search query. Although shown as separate components, it is contemplated that the component responsible for creating the object vectors may also create the search query vectors and/or that the component responsible for determining the permutations for the object vectors may also determine permutations for search query vectors.

Selection component 122 of searching engine 108 selects objects from an index to be provided in response to the search query. In exemplary aspects, selection component 122 utilizes a permutation prefix of the search query to select objects from an index. As previously mentioned, the indexes may be inverted indexes that map object vectors to a permutation prefix. Accordingly, the object vectors mapped to a permutation prefix of the search query may be selected.

In exemplary aspects, selection component 122 also selects an index from which to select the objects. The index may be selected based on a permutation prefix length associated with the index. In embodiments, an initial permutation prefix length and, consequently, an initial index, is pre-determined. Selection component 122 then identifies the posting list within the initial index that matches the permutation prefix of the query vector and determines whether the posting list satisfies a threshold recall amount. This step may be performed by comparing the number of objects within the matching posting listing to a pre-determined minimum threshold. If the posting list has fewer objects than the minimum threshold, selection component 122 selects a new index associated with a shorter permutation prefix length.

For example, considering the indexes 400 and 410 in FIGS. 4A and 4B, a search query vector may have a permutation of ACDB, and a threshold recall amount may be set to two objects. By default, selection component 122 may use index 410 associated with a permutation prefix length of three to select objects. Index 410 lists only object 308 has have a three-reference permutation prefix (i.e., ACD) that matches the permutation of the query vector. The selection component 122 determines that the number of objects in the relevant posting list is less than the threshold minimum of two. As such, selection component 122 selects an index associated with a smaller prefix length, which may be considered a less restrictive index. Index 400 is associated with a prefix length of two, and selection component identifies two objects—object 302 and object 308—as having a two-reference prefix (AC) matching the search query. Because the posting list in index 400 matching the permutation of the search query has a sufficient number of objects to satisfy the minimum threshold, the objects within the posting list may be used to form the search results provided in response to the search query. In some aspects, selection component 122 may consider posting lists in more than two indexes to find a posting list with sufficient recall.

Alternatively or in addition to recall, selection component 122 may select an index based on computational workload. As described above, an index created by indexing engine 106 may be associated with a computational workload determined, at least partly by one or more properties of the index. For example, an index associated with longer permutation prefixes will have shorter posting lists, and, thus, a lower computational workload is required to traverse a posting list within the index. Additionally, an index storing object vectors created with a product quantization scheme using more dimensions per blocks may also be associated with a lower computational workload. Because object vectors with more dimensions per blocks comprise less blocks overall, posting lists with such object vectors require less storage space and less computational power to traverse. Accordingly, selection component 122 may select an index based on available computational workload at the time the search to be run. For example, if the system is under stress or already operating at a high computational load at the time of the search, selection component 122 may select an index with a lower computational workload, which will generally be searched in a shorter time and save resources.

In exemplary embodiments, ranking component 124 of search engine 108 ranks objects identified from a posting list of a selected index. Generally, ranking component 124 ranks objects by relevancy to the search query by computing a relevancy score for each object within the identified posting list. Relevancy of the objects may be determined by proximity to the search query vector within vector space. As such, the relevancy score for each object comprises an approximate, such as a Euclidean distance, between the object vector and the search query vector in exemplary aspects.

As previously mentioned, the search query vector may have the same structure as object vectors in the selected index. For example, if the selected index stores product quantized vectors with 8 dimensions per block and 128 blocks, the search query vector similarly has 128 blocks. Using a codebook, actual values corresponding to the centroid identifiers for each block are determined. In exemplary aspects, for each block, the Euclidean distance between the query dimensions and the centroid values are computed and used as estimations of the distances between the query dimensions and the object dimensions. Other distance function, such as Manhattan distance, Hamming distance, Levenshtein distance, and the like, may be used in other embodiments. The distances determined for each block are added together, and the sum comprises the relevancy score for the object.

Figure 8:
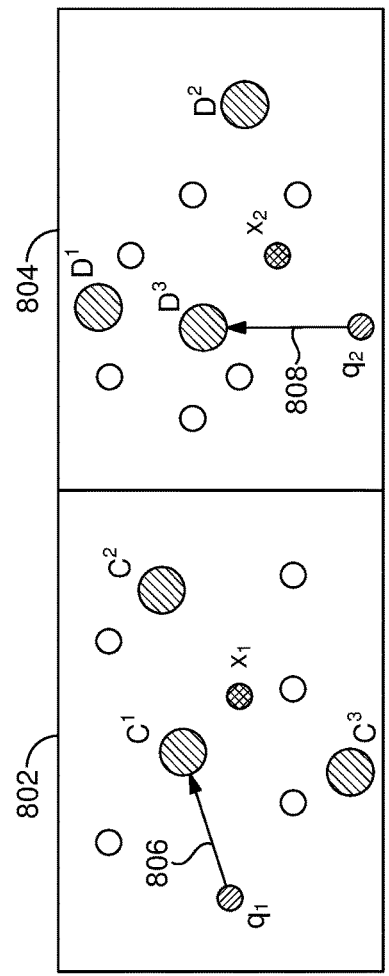
FIG. 8 depicts determining a relevancy score for an object, in accordance with embodiments of the present disclosure.

FIG. 8 illustrates determining the Euclidean distance for an example search query and object. In this example, the original vector for an object within a posting list has 4 dimensions, and the product quantized vector was formed with two blocks (two dimensions per block) and three centroids in each block. FIG. 8 depicts blocks 802 and 804, with three centroids (e.g., $C^1$, $C^2$, $C^3$, $D^1$, $D^2$, and $D^3$) in each block. The object is represented as $x=(x_1, x_2)$. Accordingly, search query vector is similarly split into two blocks so that $q=(q_1, q_2)$. In this example, $q=(q_1, q_2)$ and $x=(x_1, x_2)=(1, 3)$, where 1 and 3 are the indices of the centroids closest to $x_1$ and $x_2$, respectively. Ranking component 124 uses the codebook to determine that the actual values of (1, 3) are $C^1$ and $D^3$. Distance 806 between $q_1$ and $C^1$ in block 802 is computed, and distance 808 between $q_2$ and $D^3$ in block 804 is computed. Distances 806 and 808 are added together to obtain the relevancy score for object x. In some embodiments, all the distances between a query component and the centroids are computed and stored after the search query is received so that the distances do not need to be recomputed each time a posting list is traversed.

In the example embodiment in FIG. 8, the product quantized object vector is compared to a non-quantized query vector using an asymmetric product quantization technique. It is contemplated, however, that ranking objects may be done by approximating distances using a symmetric product quantization technique. When performing symmetric product quantization, product quantization is performed on the search query vector instead of using the codebook to determine the values of product quantized object vector. The product quantized object vector is compared to the product quantized query vector to obtain the distances between the two vectors. While determining Euclidean distance of product quantized vectors is less precise than comparing a d-dimensional vectors to a d-dimensional search vector, it also requires a much lower computational workload and can be performed more quickly.

Ranking component 122 determines relevancy scores for all the object within the identified posting list in a similar manner. In some embodiments, the distances between each query component and all centroids are stored after being initially computed so that the distances do not need to be computed each time a new relevancy stores is determined, which decreases processing time. In some embodiments, the distances between components of each object and all centroids are stored when the indexes are created to decrease processing time.

In alternative embodiments, other techniques are used for ranking objects instead of using product quantized vectors. For example, in some embodiments, linear approximating eliminating search algorithm (LAESA) is used. As such, each set of objects are assigned references, and for each object, the distance between the object and all references are computed and stored. When a search query is received, the distance between the query and the references is computed, and for each object, the triangle inequality and all the references are used to determine a lower bound of the distance between the object and the query. The largest lower bound is used as a guarantee of the distance between the query and the object. In some embodiments, this technique is used when the number of objects selected exceeds a threshold number and the product quantization is used when there are less objects than the threshold number.

Once all objects within an identified posting list are assigned a relevancy score, ranking component 124 ranks the objects based on the scores. In exemplary aspects, this ranking is sent to the user device that sent the search query. In this way, the ranking is provided in response to the search query. In some embodiments, there may be a pre-determined maximum number of results to send in response to a search query. For instance, a website on which the user submitted the search query may limit search results to 1,000 items. In this case, when the selected posting list contains more than 1,000 objects, only the first 1,000 objects with the highest relevancy scores are sent to the user device.

Example Flow Diagrams

Figure 9:
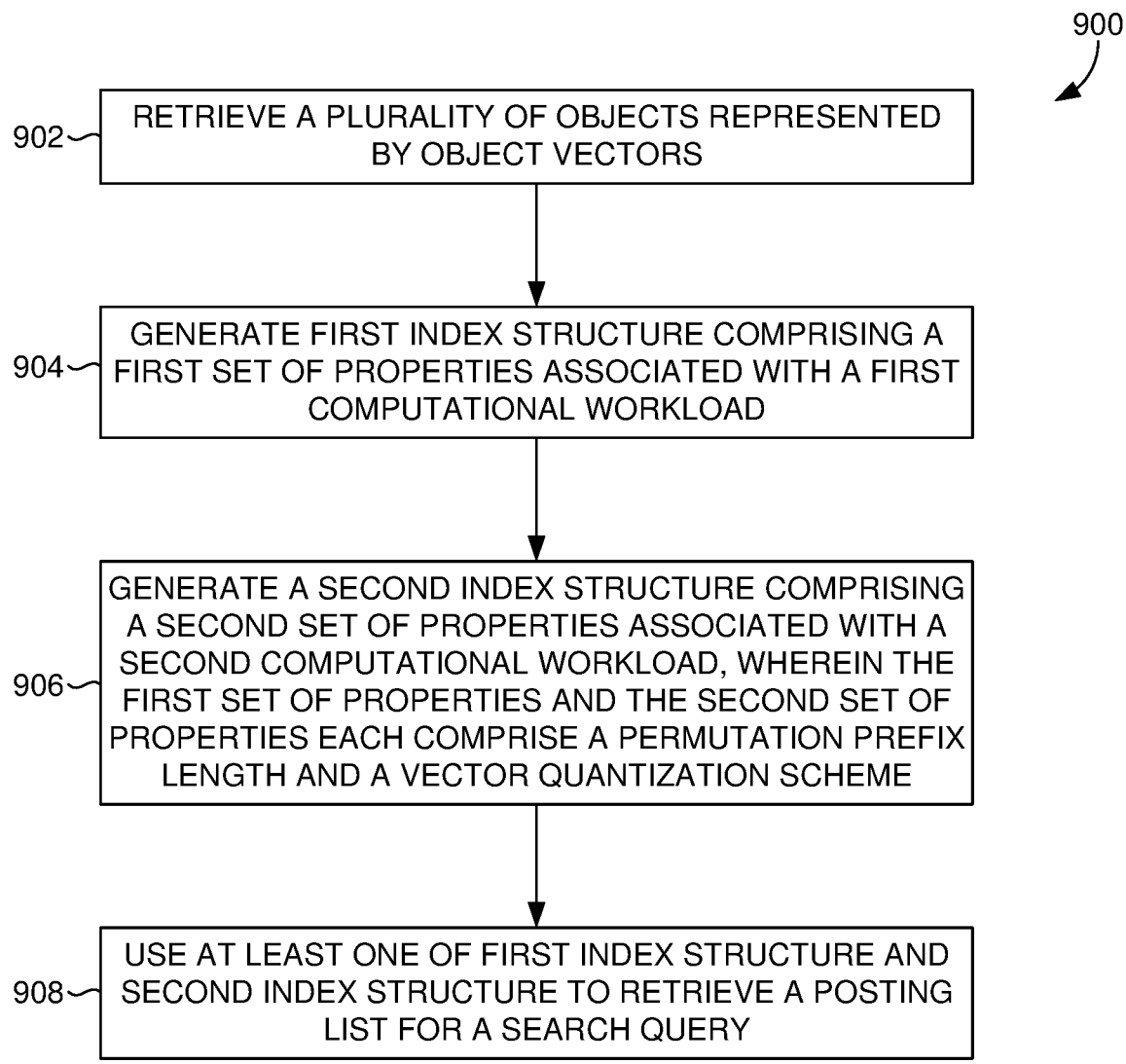
FIG. 9 depicts a flow diagram showing a method for creating indexes with different sets of properties, in accordance with embodiments of the present disclosure.
Figure 10:
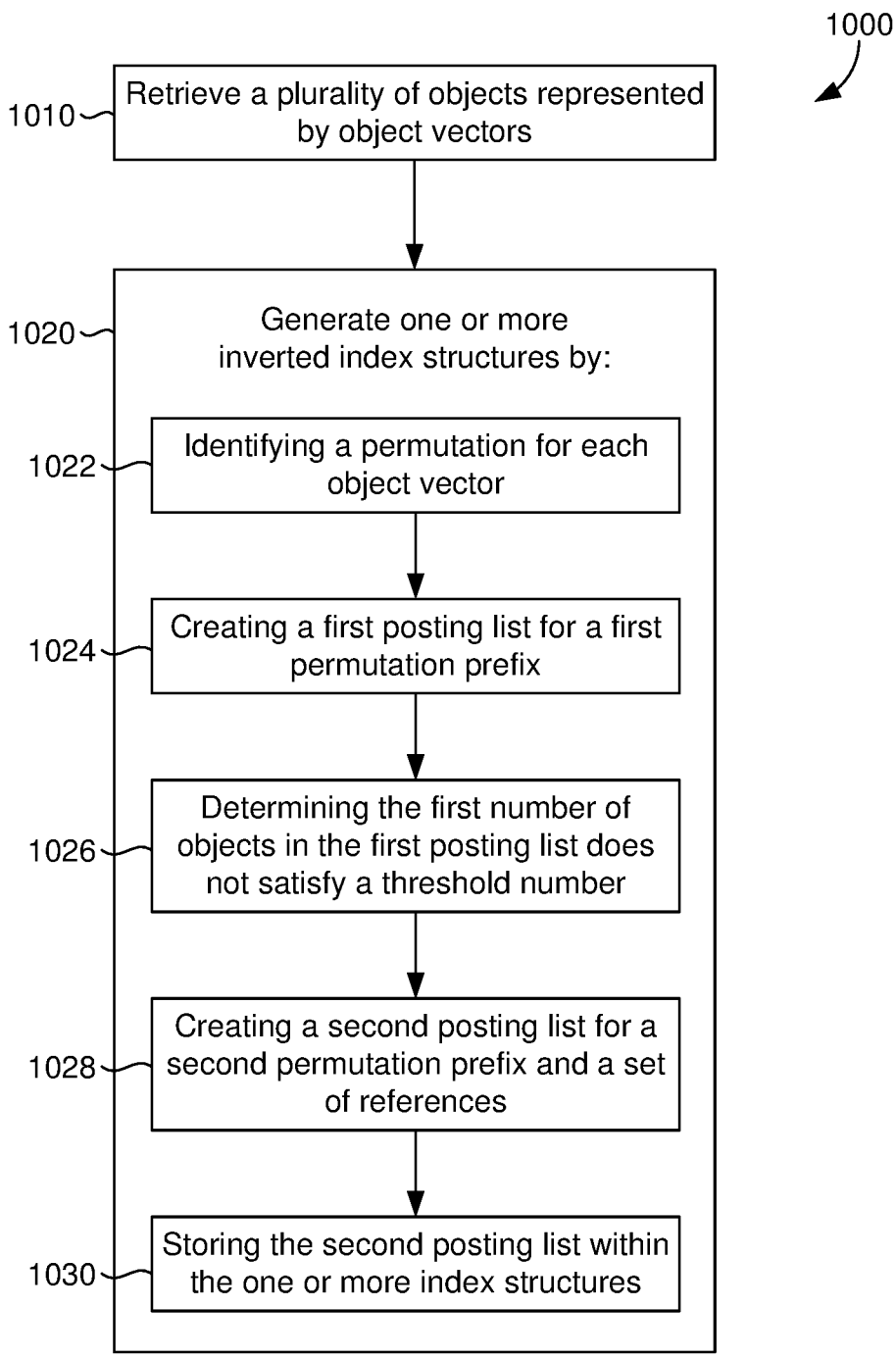
FIG. 10 depicts a flow diagram showing a method for creating an index with a posting list associated with a permutation prefix and a set of references, in accordance with embodiments of the present disclosure.
Figure 11:
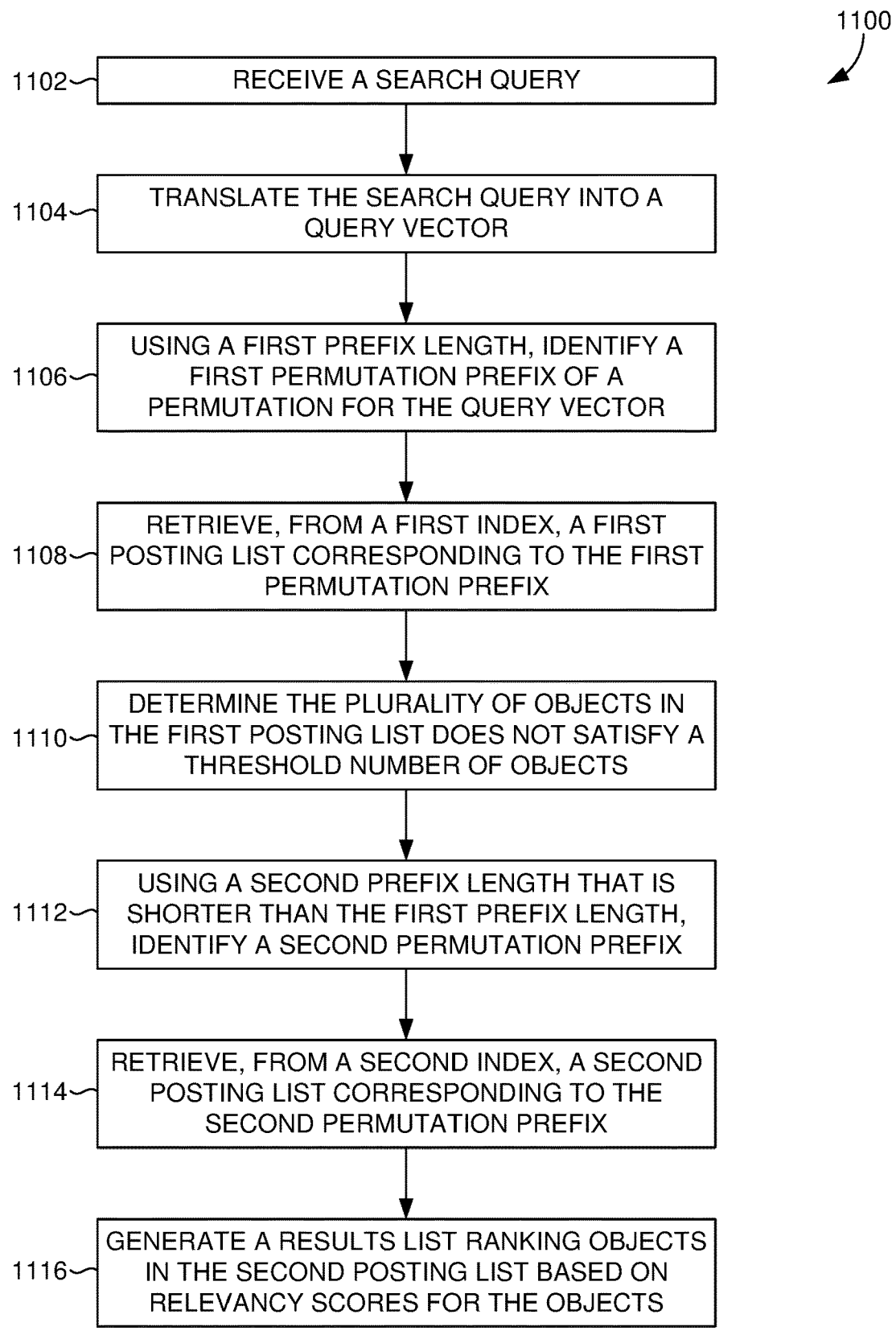
FIG. 11 depicts a flow diagram showing a method for expanding search results using indexes associated with different permutation prefix lengths, in accordance with embodiments of the present invention.

FIGS. 9 and 10 provide flow diagrams to show methods of creating indexes for objects in accordance with embodiments of the present disclosure. FIG. 11 provides a flow diagram to show a method of utilizing multiple indexes to expand search results in accordance with embodiments of the present invention. Each block of the illustrated methods comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. It is further contemplated that the processes in the blocks may be performed in an order that is different than the order in which they are presented herein, and the methods described herein may include additional steps.

Referring first to FIG. 9, a flow diagram is providing illustrated a method 900 for creating indexes with different properties. The blocks of method 900 may be performed in whole or in part by the indexing engine 106 of FIG. 1. At block 902, a plurality of objects, such as images, is retrieved. Each object is represented by an object vector. In exemplary embodiments, the objects are represented by high-dimensional object vectors. The objects may be retrieved from one or more data stores, such as data store 110, and may be received over a period of time.

At block 904, a first index structure is generated with a first plurality of posting lists. The posting lists within the first index structure comprise object vectors for the plurality of objects. The first index structure comprises a first set of properties associated with a first computational load. Similarly, at block 906, a second index structure is generated with a second plurality of posting lists. The posting lists within the second index structure also comprise object vectors for the plurality of objects, and the second index structure comprises a second set of properties associated with a second computational workload. In exemplary aspects, the second set of properties is different from the first set of properties. Further, in exemplary aspects, the first and second index structures are both inverted indexes that map permutation prefixes to object vectors. Additionally, more than two indexes with different sets of properties may be created. For example, in one example, four indexes are created with four sets of properties, and in another embodiment, ten indexes are created with ten sets of properties.

The set of properties may comprise a permutation prefix length and a vector quantization scheme. As previously described with respect to indexing component 112 of FIG. 1, the first set of properties and the second set of properties may have different permutation prefix lengths, different vector quantization schemes, or both. For example, the first index may map objects to permutation prefixes that are shorter than the permutation prefixes to which objects in the second index are mapped. The first index may also store object vectors quantized with less dimensions per block than objects stored in the second index. In both of these examples, the first computational workload may be larger than the second computational workload, indicating that traversing posting lists in the first index may require more processing power or processing time compared to the second index. Accordingly, in some embodiments, the first computational workload is different than the second computational workload.

In some embodiments, the first and second computational workloads are the same or substantially the same but are based on different sets of properties. For example, the first index may be associated with a shorter permutation prefix but contain object vectors that are quantized with more dimensions per block. Conversely, the second index may be associated with a longer permutation prefix while the object vectors are quantized with fewer dimensions per block. In this way, the permutation prefix length and vector quantization scheme properties may balance the workload for each index.

Continuing with method 900, at least one of the first index structure and the second index structure are utilized to retrieve a posting list for a search query at block 908. The index structure utilized may be selected based on available computational power at the time the search query is received. Additionally or alternatively, the index structure utilized may be based on a recall, or the amount of objects within a posting list within index. In exemplary aspects, the specific posting list is retrieved from a selected index using a permutation prefix. The permutation of the search query vector is determined, and the posting list within the index that matches a prefix of the search query vector's permutation is the retrieved posting list. Further, the object vectors within the posting list may be ranked based on relevancy scores, and the ranking of objects may be provided in response to the search query.

Referring to FIG. 10, a flow diagram is provided to depict a method 1000 for creating an index with a posting list associated with a permutation prefix and a set of references. The blocks of method 1000 may be performed in whole or in part by the indexing engine 106 of FIG. 1. At block 1010, a dataset comprising a plurality of objects is retrieved, and each object is represented by an object vector. In exemplary embodiments, the objects are each represented by a high-dimensional object vector.

At block 1020, one or more index structures are generated. The one or more index structures may each comprise an inverted index. To generate the one or more index structures, at block 1022, a permutation is identified for each object vector. As described above with reference to FIGS. 3, 4A, and 4B, the permutation is a sequence of references arranged by increasing distance to the object vector in a vector space. In exemplary embodiments, the references are identified using a k-nearest neighbor algorithm.

At block 1024, a first posting list is created for a first permutation prefix. The first posting list comprises a first number of objects that each have permutations with the first permutation prefix. At block 1026, it is determined that the first number of objects in the first posting list does not satisfy a threshold number. In exemplary aspects, the threshold number is a pre-determined minimum number of objects, also referred to herein as a minimum recall, and the first number of objects is less than the minimum number. In response to determining the first number of objects fails to satisfy the threshold, a second posting list is created for a second permutation prefix and a set of references. The second permutation prefix comprises a portion of the first permutation prefix, and the set of references comprises two or more references. The second posting list includes a second number of objects that each have permutations with the second permutation prefix and one of the two or more references in the set of references. With regards to the order of references within the objects' permutations, the reference from the set of references is immediately after the references within the second permutation prefix. At block 1028, the second posting list is stored as part of the one or more index structures. The first posting list may be discarded, but in some embodiments, the first posting list may be stored in an index that is different from the index in which the second posting list is stored.

In some embodiments, the second posting list is created after determining a first posting list has insufficient recall and that a third posting list satisfies a minimum recall amount. The third posting list may be associated with a third permutation prefix that is the same length as the first permutation prefix and that includes the second permutation prefix. Another reference following the third permutation prefix is part of the set of references. Accordingly, the second posting list associated with the second permutation prefix and a set of references may be a combination of the first and third posting lists.

In some embodiments, method 1000 further includes providing search results in response to a search query using the second posting list. As such, a search query may be received and translated into a vector. In exemplary aspects, the search query vector is a product quantized vector that is divided in the same number of blocks as the object vectors within the second posting list. Additionally, a permutation for the search query vector is determined. Upon determining that the search query vector's permutation matches the second permutation prefix and one of the references within the set of references, the object vectors within the second posting list are selected and provided to a user device that submitted the search query.

FIG. 11 provides a flow diagram depicting a method 1100 for expanding search results using indexes associated with different permutation prefix lengths. The blocks of method 1100 may be performed in whole or in part by the searching engine 108 of FIG. 1. At block 1102, a search query is received. The query may be received from a user device, such as user device 102, and may be received though a submission on a website's search field. At block 1104, the search query is translated into a query vector. In some embodiments, the search query comprises high-dimensions content and, as such, the search query vector is a quantized vector. In exemplary aspects, the query vector is translated using product quantization.

Continuing with method 1100, at block 1106, a first prefix of a permutation for the query vector is determined using a first prefix length. In exemplary aspects, the first prefix length is a default initial length, but it is also contemplated that the first prefix length may be determined based on computational workload available at the time the query is received. At block 1108, a first posting list is retrieved from a first index. The first posting list corresponds to the first prefix of the permutation for the query vector and comprises a plurality of objects. Each object is represented by an object vector, such as a product quantized vector, with permutations matching the first prefix.

At block 1110, the plurality of objects in the first posting list is determined to not satisfy a threshold number of objects. In other words, the first posting list is determined to have insufficient recall. A second prefix of the query vector's permutation is then identified using a second prefix length at block 1112. The second prefix length is shorter than the first prefix length. In exemplary embodiments, this step is automatically performed upon determining the first posting list has insufficient recall for the received search query.

At block 1114, a second posting list corresponding to the second prefix is retrieved from a second index. The second posting list comprises a second plurality of objects each represented by an object vector, such as a product quantized object vector. The object vectors within the second posting list have permutations matching the second permutation prefix. In exemplary embodiments, the second plurality of objects includes the first plurality of objects and additional objects. In some aspects, the second plurality of objects is determined to satisfy the threshold number of objects. If the second plurality of objects is determined to not satisfy the threshold number of objects, additional posting lists may be retrieved until one is found to satisfy the threshold number of objects. For example, a third posting list corresponding to a third permutation prefix that is shorter than the second permutation prefix may be retrieved. Alternatively, the third posting list retrieved may correspond to a third permutation prefix and a set of references as described with respect to FIG. 10.

Continuing with FIG. 11, where the second posting is determined to satisfy the threshold number of objects, a results list comprising at least some of the objects in the second plurality of objects is generated at block 1116. The results list may rank objects within the second posting list based on relevancy scores for the objects. Relevancy scores may comprise estimations of the proximity between the query vector and the object vector as described above with reference to FIG. 8. The results list may be transmitted to the user device that submitted the search query and displayed to the user.

Example Operating Environment

Figure 12:
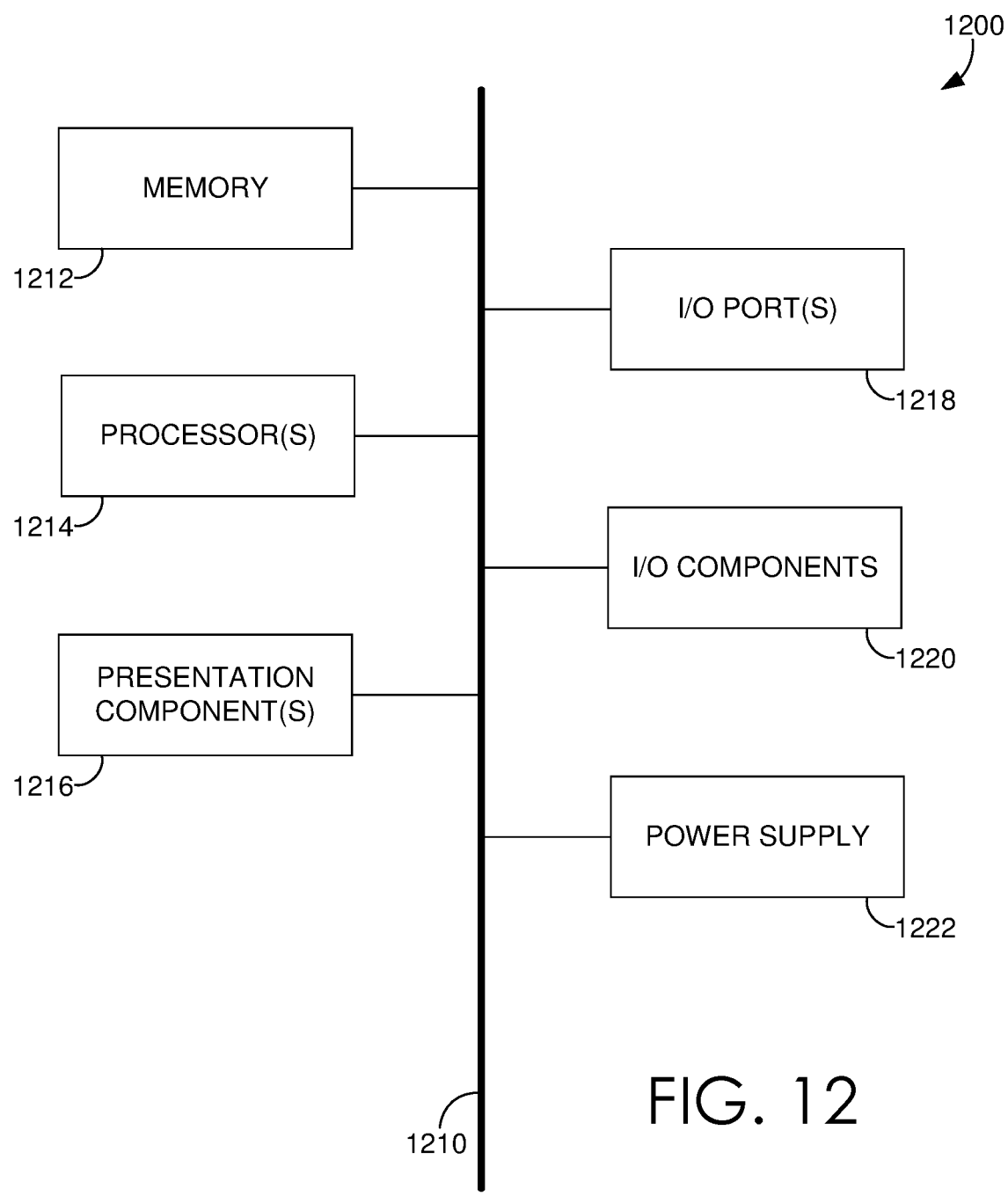
FIG. 12 is a block diagram of an example operating device in which embodiments of the present disclosure may be employed.

Having described an overview of embodiments of the present invention, an exemplary operating environment in which embodiments of the present invention may be implemented is described below in order to provide a general context for various aspects of the present invention. Referring now to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output (I/O) ports 1218, input/output components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. As used herein, computer storage media does not comprise non-transitory media such as signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. A computerized method executed by one or more computing devices, the computerized method comprising:
   receiving a search query;
   translating the search query into a query vector;
   determining a first prefix of a permutation for the query vector based on a first prefix length of the first prefix;
   retrieving a first posting list from an index based on the first prefix of the permutation for the query vector, the first posting list comprising a plurality of objects;
   based on retrieving the first posting list, determining the plurality of objects in the first posting list from the index does not satisfy a threshold number of objects;
   based on the plurality of objects not satisfying the threshold number of objects, identifying a second prefix of the permutation for the query vector based on a second prefix length of the second prefix being shorter than the first prefix length of the first prefix;
   based on identifying the second prefix, retrieving a second posting list from the index, the second posting list comprising a plurality of objects each represented by an object vector having one or more permutations that match the second prefix, wherein the object vector for each of the plurality of objects of the second posting list has at least two dimensions per block and a plurality of centroids in each block;
   based on retrieving the second posting list, determining that the plurality of objects in the second posting list satisfies the threshold number of objects;
   based on determining that the plurality of objects in the second posting list satisfies the threshold number of objects, ranking the plurality of objects in the second posting list using a relevancy score, the relevancy score being determined based on a distance between one of the plurality of centroids and the query vector; and
   based on ranking the plurality of objects in the second posting list, generating search results for the search query, the search results comprising at least some of the plurality of objects of the second posting list.

2. The computerized method of claim 1, wherein the first prefix length is determined based on a computational workload available when the search query is received.

3. The computerized method of claim 1, further comprising applying product quantization to the object vector of the second posting list to generate quantized vector results for generating the search results based on the quantized vector results.

4. The computerized method of claim 3, wherein the quantized vector results each comprise a series of centroid identifiers to represent a closest centroid for each of a plurality of blocks.

5. The computerized method of claim 1, wherein the permutation for the query vector is determined by selecting a plurality of reference points within a vector space, each reference point selected using at least one unsupervised learning algorithm.

6. The computerized method of claim 1, wherein the plurality of objects in the second posting list comprise a plurality of images.

7. The computerized method of claim 1, wherein the index comprises an inverted index.

8. The computerized method of claim 1, wherein the plurality of objects in the second posting list are each assigned references, such that for each of the plurality of objects, a triangle inequality and the assigned references are used to determine a lower bound of a distance between an object and the search query for ranking the plurality of objects.

9. A system comprising:
one or more data stores;
one or more processors that execute computer-usable instructions stored on one or more computer-storage media to perform operations comprising:
retrieving a posting list based on a prefix length corresponding to a prefix of a permutation for a query vector, the posting list comprising a plurality of objects each represented by an object vector having one or more permutations that match the prefix, wherein the object vector for each of the plurality of objects has at least two dimensions per block and a plurality of centroids in each block;
determining that the plurality of objects in the posting list satisfies a threshold number of objects;
based on determining that the plurality of objects in the posting list satisfies the threshold number of objects, ranking the plurality of objects in the posting list based on a relevancy score, the relevancy score being determined based on stored distances between one of the plurality of centroids in each block and a centroid corresponding to the query vector;
based on ranking the plurality of objects in the posting list based on the relevancy score, and based on determining that the plurality of objects in the posting list satisfies the threshold number of objects, generating search results for the search query, the search results comprising at least some of the plurality of objects of the posting list.

10. The system of claim 9, further comprising:
applying product quantization to the object vector of the posting list;
generating a quantized vector for the object vector based on applying the product quantization; and
generating the search results based on the quantized vector.

11. The system of claim 9, wherein the permutation for the query vector is determined by selecting a plurality of reference points within a vector space, each reference point selected using a k-means algorithm.

12. The system of claim 9, wherein the search query comprises an image, and the plurality of objects in the posting list comprise a plurality of images.

13. The system of claim 9, wherein the search results are generated based on a Levenshtein distance between the query vector of the search query and the object vector of each of the plurality of objects.

14. One or more non-transitory computer-readable storage media having computer-executable instructions embodied thereon that, when executed by one or more processors, perform a method comprising:
receiving a search query;
based on receiving the search query, retrieving a posting list from one or more indexes based on a prefix length of a prefix corresponding to query vector of the search query, the posting list comprising one or more object vectors having one or more permutations that match the prefix, the one or more object vectors having at least two dimensions per block and a plurality of centroids in each block;
determining that objects corresponding one or more object vectors in the posting list satisfy a threshold number of objects;
based on determining that the objects satisfy the threshold number of objects, ranking the objects in the posting list using a relevancy score that is determined from stored distances between one of the plurality of centroids in each block and a centroid corresponding to the query vector; and
based on ranking the objects in the posting list, generating search results for the search query, the search results comprising at least some objects of the posting list.

15. The one or more non-transitory computer-readable storage media of claim 14, wherein the posting list is retrieved after retrieving a first posting list having a first prefix with a first prefix length corresponding to the query vector, and wherein the posting list is retrieved after determining that objects of the first posting list with the first prefix length do not satisfy the threshold number of objects, wherein the objects of the first posting list are stored within an index that is different from the one or more indexes.

16. The one or more non-transitory computer-readable storage media of claim 15, wherein the one or more object vectors of the posting list comprise more dimensions per blocks compared to object vectors of the objects of the first posting list, and wherein the objects in the posting list are ranked further based on using a linear approximating eliminating search algorithm to determine distances between the one or more object vectors and the query vector.

17. The one or more non-transitory computer-readable storage media of claim 14, wherein the one or more object vectors of the posting list is a quantized object vector generated by applying product quantization.

18. The one or more non-transitory computer-readable storage media of claim 17, wherein the quantized object vector is compared to the query vector using an asymmetric product quantization technique to determine a distance between the quantized object vector and the query vector.

19. The one or more non-transitory computer-readable storage media of claim 14, wherein the relevancy score for an object in the posting list is determined using a sum of the distances for a block.

20. The one or more non-transitory computer-readable storage media of claim 14, wherein the plurality of objects in the posting list are each assigned references, such that for each of the plurality of objects, a triangle inequality and the assigned references are used to determine a lower bound of a distance between an object and the search query for ranking the plurality of objects.

\* \* \* \* \*